United States Patent [19]

Cedrone

[11] Patent Number: 5,083,875
[45] Date of Patent: Jan. 28, 1992

[54] TERMINATED HIGH-STRENGTH FIBER OPTIC CABLES AND METHOD FOR TERMINATION THEREOF

[75] Inventor: Alfredo Cedrone, Austin, Tex.

[73] Assignee: W. L. Gore & Associates, Inc., Newark, Del.

[21] Appl. No.: 974,781

[22] Filed: Oct. 15, 1990

[51] Int. Cl.⁵ ............................................. G02B 6/44
[52] U.S. Cl. ................................... 385/139; 385/107
[58] Field of Search ............. 350/96.20, 96.21, 96.22, 350/96.23; 24/115 H, 298; 403/209; 174/79, 113 R

[56] References Cited

U.S. PATENT DOCUMENTS

| | | | |
|---|---|---|---|
| 3,982,060 | 9/1976 | Avery et al. | 350/96.20 X |
| 4,081,208 | 3/1978 | Meade | 350/96.23 X |
| 4,514,036 | 4/1985 | McDonald | 350/96.23 |
| 4,605,818 | 8/1986 | Arroyo et al. | 350/96.23 X |
| 4,675,475 | 6/1987 | Bortner et al. | 174/113 R |
| 4,890,363 | 1/1990 | Cross | 24/298 |

Primary Examiner—John D. Lee
Assistant Examiner—Phan T. Heartney
Attorney, Agent, or Firm—Gary A. Samuels

[57] ABSTRACT

An optical fiber cable having a loop of strong braided sheath anchored within it to provide terminal strength and a protective tube surrounding the optical fibers of the cable as they exit the cable through a gap in the sheath for termination. The protective tube allows retention of signal quality of optical fibers by preventing damage to coating layers on the fibers passing through the braided sheath which may be under high tension.

6 Claims, 2 Drawing Sheets

TERMINATED HIGH-STRENGTH FIBER OPTIC CABLES AND METHOD FOR TERMINATION THEREOF

FIELD OF THE INVENTION

This invention pertains to high-strength optical fiber cables and methods of terminating them.

BACKGROUND OF THE INVENTION

Transmission lines or optical waveguides for carrying a beam of light as a means for communicating signals or data through a glass or polymer fiber are well known in the art. Optical fibers of glass are coated with layers of glass and polymers of various properties of hardness, softness, smoothness, flexibility, adherence to the fiber, and refractive index to mitigate the effects of surface imperfections of the fiber and stresses of bending and contact with other materials during manufacture, installation, and use. Similarly, plastic optical fibers are coated for equivalent reasons. Either glass or plastic fibers are said to be buffered against the environment and events which can result in signal loss by their effect on the fiber.

When optical fibers are manufactured into data or signal transmitting cables, the buffered fibers are sometimes provided with high-strength members, such as braided jackets, to provide strength to the cable so it may be unreeled, pulled, strung from supports, used as a tow cable, and otherwise handled physically during manufacture, installation, or use for its intended purpose of transmitting signals. One kind of useful strength member is a braided sheath of strong polymer fibers surrounding the optical fiber cable. The current method for terminating such a cable is by pulling out the optical fiber through openings in the weave of the braid to be terminated. The braid can then be looped around a termination pin and the free end of the braid attached to itself to form a loop in the braid to provide a high-strength termination of the cable. The problem remaining is that as the braid is placed under strain, the effect of pressure of the weave of the braid on the optical fiber is one of cutting into the protective layers of the optical fiber with resultant disastrous impact upon the quality of optical performance of the cable. The invention provides a solution to this problem by eliminating the shearing action of the braid on the optical fibers.

SUMMARY OF THE INVENTION

The invention comprises a protective means surrounding the optical fibers of an optical fiber cable at the point where the fibers pass through a gap in the weave of the strong protective braid surrounding the optical fibers which form the core of the cable when those optical fibers are passed out of the cable for termination, a terminated optical fiber cable including the protective means, and a process for terminating a braided sheath of an optical fiber cable. The protective means for the optical fibers comprises a protective tube inserted through a gap in the weave of the protective braid to surround the optical fibers as they pass out of the cable. The terminating process comprises passing the fibers through an opening in the weave of the braided sheath back into the cable between the core and sheath of the cable to anchor them.

DETAILED DESCRIPTION OF THE INVENTION

Figure 1:
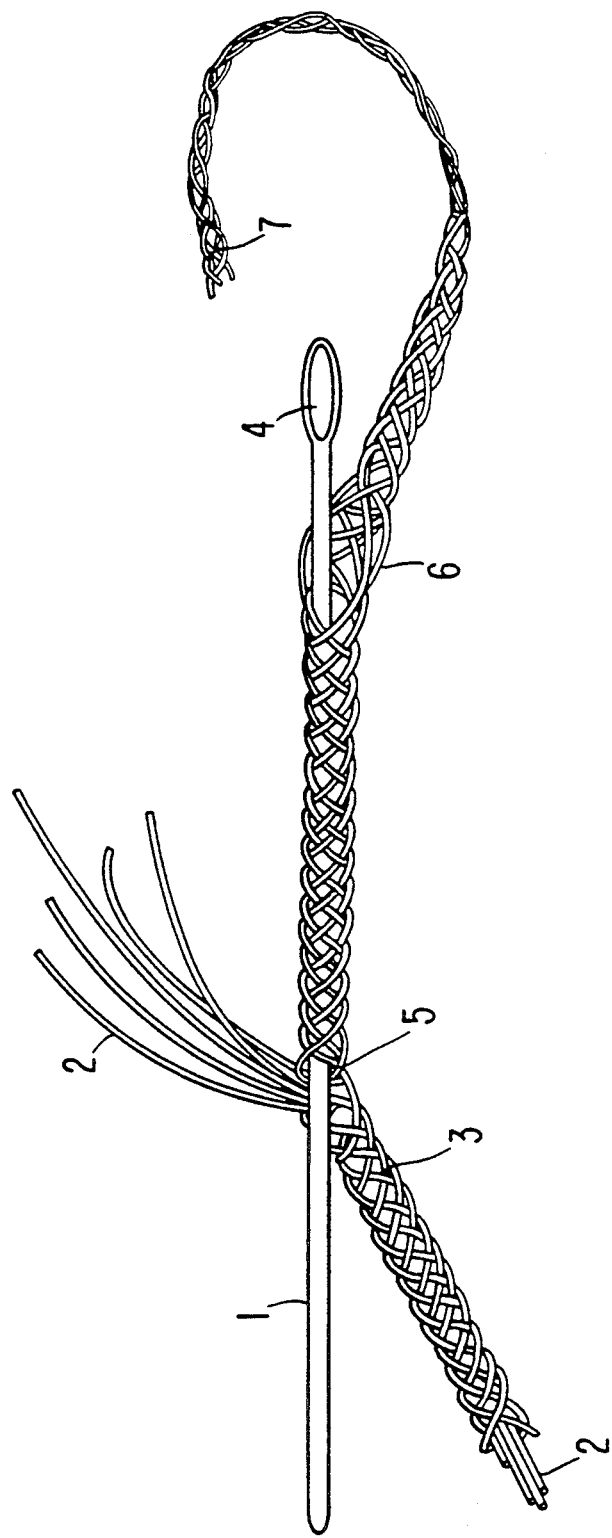
FIG. 1 shows the cable of the invention with optical fibers of the cable exiting an opening in the cable and a tool in place in the braid of the cable prior to insertion of the end of the braid in the eye of the tool.
Figure 2:
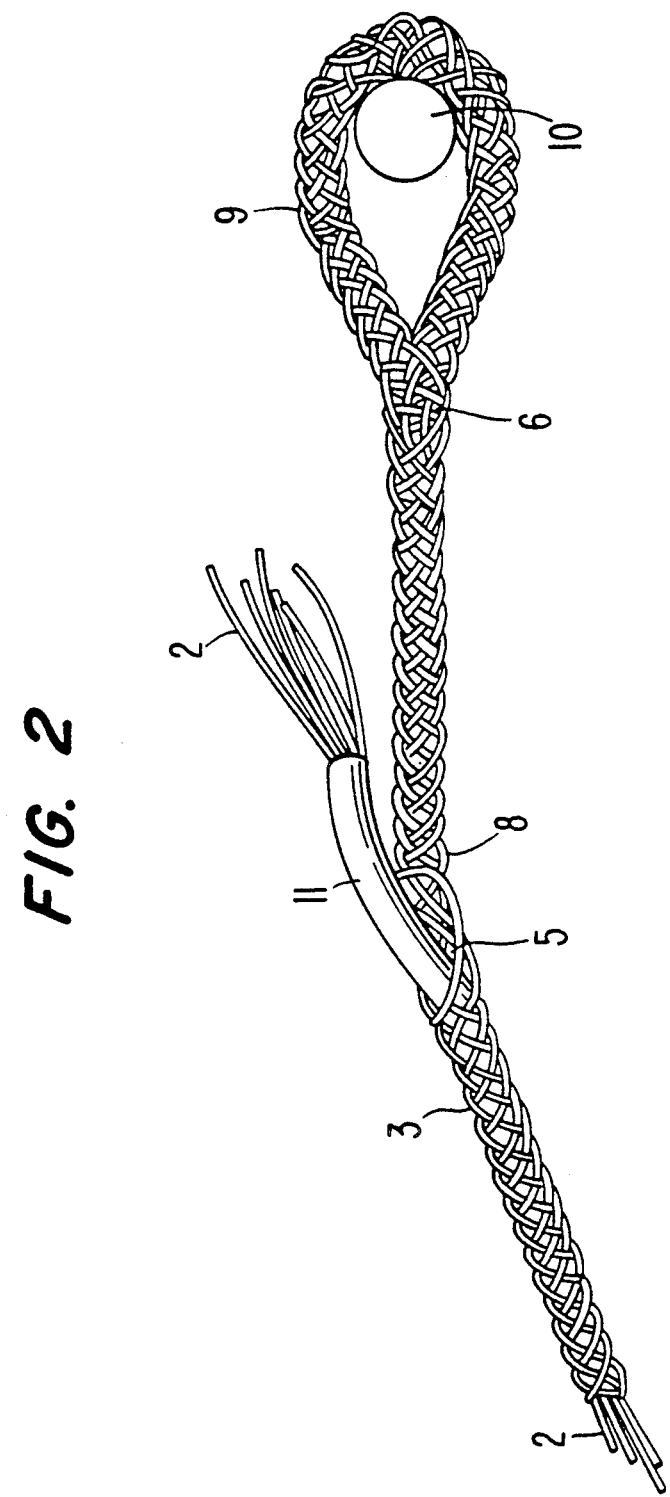
FIG. 2 describes the cable of the invention with the loop formed in the braid hooked over a termination pin and optical fibers of the cable extending from the protective tube for optical termination.

The invention comprises a protective means for the optical fibers of a braided sheath-protected optical fiber cable during termination of the cable by withdrawing the optical fibers of the cable through a hard, stiff protective exit tube through a first opening 5 in the braid 3 to the termination point of the optical fibers. As shown in the figures, the end of the braid 7 of sheath 3 is looped around a termination pin 10 and passed back inside a second opening 6 in the braid 3 to thereby become anchored within braid 3 to provide high longitudinal strength to the terminated cable. The exit tube 11 for the optical fibers 3 of the braid comprises any suitable self-supporting material, such as copper or stainless steel metal tubing or plastics, such as acetylene-butadiene-styrene (ABS), polyvinyl chloride, polysufone, polycarbonate, or polyester.

The exit tube 11 is passed around the bundle of optical fibers 2 comprising the signal transmitting portion of the cable at a point where the braiding of the sheath 3 is halted, then the braiding continued to provide material for passing around termination pin 10 to anchor the cable. Alternatively, a few inches from the end of the cable first opening 5 is made in the braided sheath 3 of the cable by picking apart the braid at that point. The optical fibers 2 of the cable are carefully pulled back and out of the cable through first opening 5, then a short section of hard hollow tubing 11 passed over the optical fibers 2 of the cable as a unit and the end of the tube forced through first opening 5 into the cable to provide a protective sheath for the optical fibers passing out of opening 5.

The end 7 of the loop of braided sheath left after the ends of optical fibers 2 have been extracted may be clamped to itself to anchor the end of the cable, but a better method for anchoring an end of a cable has been found. Into first opening 5 a long slim tool 1 having an eye 4 in the inserted end is passed into the braided sheath and about halfway to the end of the braid material passed outside the sheath in a second opening 6 placed into the sheath similarly to opening 5 by carefully picking apart the braid of the sheath at that point. End 7 of the braided sheath is inserted in eye 4 of tool 1. Tool 1 is then withdrawn from the sheath pulling end 7 of braid 3 inside the sheath at second opening 6 to a point near first opening 5, then withdrawing tool 1 from opening 5. The braid now looped back within itself is strongly held by the material comprising the braid. When tension is applied to loop 9 of the braided sheath, the sheath grips tightly the fibers of the end of sheath buried within it; the stronger the pull of tension, the tighter the grip. At the same time, tube 11 protects the optical fibers 2 within from being squeezed at the exit point, opening 5, such that the protective coatings then are permanently or temporarily damaged with resultant loss of signal quality in the optical fibers.

Alternatively, the loop 9 in the end of the braided sheath may be formed first in the termination process, then hard tube 11 placed around fibers 2 and forced into the cable through first opening 5.

As braid materials for providing tension and torsional strength to the cable may be used high-strength polymer fibers, such as a polyester-based fiber known as Spectrofiber ®, manufactured by Allied Chemical Corporation, or Vectran ® fiber, a liquid crystal polymer manufactured by Roechst Celanese Corporation and having the polyester structure $[-O-C_6H_4-CO-]_x$ $[-O-C_{10}H_6-CO-]_y$, where $-O-C_6H_4-CO-$ is a parahydroxybenzenecarbonyl group and $-O-C_{10}H_6-CO-$ is a 6-hydroxy-2-naphthalenecarbonyl group. Also useful may be Kevlar ® polyaramid fibers, manufactured by E. I. DuPont de Nemours & Co. Any adequately strong polymer fiber may be used as a braided sheath fiber material.

Tube 11 may be anchored in place in the cable by affixing the end of tube 11 outside the cable to the cable by an adhesive wrap around tube 11 and the cable, for instance. Other alternative methods for holding tube 11 in place may be used.

Loop 9 of the cable may be looped over termination pin 10 or the like to provide a strong cable termination and optical fibers 2 may now be optically terminated.

The methods and the cable of the invention are useful whenever strength is demanded for an optical fiber cable which may be extended a considerable distance between attachment points, such as along a well-logging cable to downhole instrumentation, to link underwater surveillance instruments and vehicles together, or towed instrumentation behind an aircraft, for example.

I claim:

1. A terminated optical fiber cable including a braided sheath surrounding one or more optical fibers and a short segment of protective means surrounding the optical fibers at a point where said fibers pass through an opening in the weave of the braid of said braided sheath at a specified distance from the terminated end of said cable.

2. An optical fiber cable of claim 1 wherein said protective means comprises a hollow tube.

3. An optical fiber cable of claim 2 wherein said tube comprises metal or plastic.

4. An optical fiber cable of claim 1 or 2 having a loop formed in the end of said braided sheath for anchoring said cable to a connector.

5. A process for terminating a braided sheath surrounding a cable comprising the steps of:
   (a) separating the fibers of said sheath at a point several inches from the end of said sheath to form a first opening in said sheath;
   (b) extracting said cable from said opening in said sheath;
   (c) inserting a thin narrow tool, having an eye at one end, eye first through said first opening in said braided sheath to a point about half way to the end of said sheath and out of said sheath through a second opening formed therein by separating the fibers of said braided sheath;
   (d) threading the end of said braided sheath through the eye of said tool;
   (e) pulling said end of said braided sheath as a unit inside said braided sheath through said second opening to leave said end of braided sheath buried inside said braided sheath and a loop in the end of said braided sheath as said tool is withdrawn from said first opening in said braided sheath;
   (f) passing said cable end into said protective means;
   (g) sliding said protective means over the end of and around said cable to said first opening in said braided sheath;
   (h) inserting said protective means through said first opening to reside partially inside said braided sheath while surrounding said cable;
   (i) anchoring said protective means to said braided sheath to hold said protective means in place.

6. A process of claim 5 also including anchoring said loop of said braided sheath over a connector pin and terminating said cable.

* * * * *